US010472976B2

(12) United States Patent
Freeman et al.

(10) Patent No.: US 10,472,976 B2
(45) Date of Patent: Nov. 12, 2019

(54) MACHINABLE CMC INSERT

(71) Applicants: Rolls-Royce North American Technologies, Inc., Indianapolis, IN (US); Rolls-Royce Corporation, Indianapolis, IN (US)

(72) Inventors: Ted J. Freeman, Danville, IN (US); Thomas D. Nixon, Brownsburg, IN (US); Sean E. Landwehr, Avon, IN (US); Aaron D. Sippel, Zionsville, IN (US); Donald W. Reinhart, Brownsburg, IN (US)

(73) Assignees: Rolls-Royce Corporation, Indianapolis, IN (US); Rolls-Royce American Technologies, Inc., Indianapolis, IN (US)

( * ) Notice: Subject to any disclaimer, the term of this patent is extended or adjusted under 35 U.S.C. 154(b) by 545 days.

(21) Appl. No.: 15/173,126

(22) Filed: Jun. 3, 2016

(65) Prior Publication Data

US 2016/0356164 A1  Dec. 8, 2016

Related U.S. Application Data

(60) Provisional application No. 62/171,280, filed on Jun. 5, 2015.

(51) Int. Cl.
*F01D 5/28* (2006.01)
*F01D 25/00* (2006.01)
(Continued)

(52) U.S. Cl.
CPC .............. *F01D 5/284* (2013.01); *B29C 65/02* (2013.01); *B29C 65/48* (2013.01); *F01D 25/005* (2013.01);
(Continued)

(58) Field of Classification Search
CPC ........ F01D 5/282; F01D 25/246; F23R 3/007; F23R 3/002; F23R 2900/00018;
(Continued)

(56) References Cited

U.S. PATENT DOCUMENTS 4,341,826 A * 7/1982 Prewo ..................... B32B 18/00
123/193.1
4,614,453 A * 9/1986 Tsuno ................... C04B 37/021
403/30

(Continued)

OTHER PUBLICATIONS

Office Action from U.S. Appl. No. 15/172,975, dated Nov. 29, 2018, 17 pp.

(Continued)

*Primary Examiner* — J. Todd Newton
(74) *Attorney, Agent, or Firm* — Schumaker & Sieffert, P.A.

(57) ABSTRACT

An assembly comprising a ceramic matrix composite component, a monolithic insert, and a polymer char and a method for producing the same. The ceramic matrix composite component may include an exterior surface, with the monolithic insert bonded to the exterior surface of the ceramic matrix composite component. The polymer char may be sandwiched between the monolithic insert and the exterior surface of the ceramic matrix composite that may bond the monolithic insert to the ceramic matrix composite component.

19 Claims, 12 Drawing Sheets

(51) Int. Cl.
  *F01D 25/24* (2006.01)
  *B29L 31/00* (2006.01)
  *F02K 1/04* (2006.01)
  *F23R 3/00* (2006.01)
  *B29C 65/02* (2006.01)
  *B29C 65/48* (2006.01)

(52) U.S. Cl.
  CPC .............. *F01D 25/246* (2013.01); *F02K 1/04* (2013.01); *F23R 3/007* (2013.01); *B29L 2031/7504* (2013.01); *F05D 2240/11* (2013.01); *F05D 2240/12* (2013.01); *F05D 2300/2261* (2013.01); *F05D 2300/6033* (2013.01); *F05D 2300/611* (2013.01); *F05D 2300/614* (2013.01); *F23M 2900/05004* (2013.01); *F23R 2900/00018* (2013.01)

(58) Field of Classification Search
  CPC ......... F05D 2240/11; F05D 2300/6033; F05D 2240/12; F05D 2300/611; F05D 2300/614; F05D 2300/2261
  USPC .................................................... 416/241 B
  See application file for complete search history.

(56) References Cited

U.S. PATENT DOCUMENTS

| | | | | |
|---|---|---|---|---|
| 4,861,638 A * | 8/1989 | Huether | ................. | B32B 15/04 428/71 |
| 4,909,300 A * | 3/1990 | Horie | ................. | B01D 39/2093 164/69.1 |
| 5,153,295 A * | 10/1992 | Whitmarsh | ........... | C04B 35/571 525/475 |
| 5,198,173 A | 3/1993 | Terzia et al. | | |
| 5,372,868 A * | 12/1994 | Prewo | ....................... | E04C 2/34 428/120 |
| 5,391,428 A * | 2/1995 | Zender | ................. | C04B 35/806 428/34.4 |
| 5,498,760 A * | 3/1996 | Piketty-Leydier | ........ | B64C 1/38 427/228 |
| 5,780,157 A * | 7/1998 | Tuffias | .................... | C23C 16/01 244/133 |
| 5,851,403 A | 12/1998 | Petrisko et al. | | |
| 5,985,205 A * | 11/1999 | Atmur | ..................... | C04B 41/52 264/624 |
| 6,254,935 B1 * | 7/2001 | Eaton | .................... | C04B 41/009 427/290 |
| 6,265,078 B1 * | 7/2001 | Atmur | ..................... | C04B 41/009 428/446 |
| 6,296,941 B1 * | 10/2001 | Eaton, Jr. | ................ | C04B 41/009 428/446 |
| 6,342,269 B1 * | 1/2002 | Yoshida | ................ | C04B 35/571 427/249.3 |
| 6,358,565 B1 * | 3/2002 | Krenkel | ................ | C04B 35/565 427/202 |
| 6,419,449 B2 | 7/2002 | Ferber et al. | | |
| 6,497,776 B1 * | 12/2002 | Butler | ..................... | B32B 18/00 156/145 |
| 6,576,076 B1 * | 6/2003 | Tani | ....................... | C04B 35/571 156/89.26 |
| 6,589,677 B1 * | 7/2003 | Sun | ....................... | C04B 41/009 416/241 B |
| 6,676,783 B1 * | 1/2004 | Merrill | ................... | C04B 28/34 156/89.11 |
| 7,163,653 B2 * | 1/2007 | Ehnert | ..................... | F16D 69/02 264/259 |
| 7,488,157 B2 * | 2/2009 | Marini | ..................... | F01D 5/147 416/193 A |
| 7,832,972 B2 | 11/2010 | Jarmon | | |
| 7,874,059 B2 * | 1/2011 | Morrison | .............. | F16B 5/0266 29/446 |
| 8,061,977 B2 * | 11/2011 | Keller | .................... | F01D 21/045 415/173.1 |
| 8,322,983 B2 * | 12/2012 | Marini | .................... | F23R 3/007 415/134 |
| 8,574,470 B2 * | 11/2013 | Simpson | ............... | C04B 37/025 264/29.5 |
| 9,657,409 B2 * | 5/2017 | Sandgren | ................ | C08L 83/04 |
| 9,708,226 B2 * | 7/2017 | Lazur | ................ | C04B 35/62863 |
| 9,719,420 B2 * | 8/2017 | DiMascio | ................ | C04B 41/91 |
| 9,815,943 B2 * | 11/2017 | Sherwood | .............. | C08G 77/20 |
| 9,975,815 B2 * | 5/2018 | Steibel | ....................... | B32B 7/02 |
| 2003/0021901 A1 * | 1/2003 | Gasse | ................. | C04B 41/5071 427/376.2 |
| 2003/0091788 A1 * | 5/2003 | Schroder | ............... | F16C 33/043 428/137 |
| 2003/0207155 A1 * | 11/2003 | Morrison | ............... | B32B 18/00 428/699 |
| 2004/0067316 A1 * | 4/2004 | Gray | ..................... | C04B 35/573 427/376.1 |
| 2004/0110041 A1 * | 6/2004 | Merrill | .................... | C04B 35/10 428/699 |
| 2004/0115395 A1 * | 6/2004 | Cairo | ...................... | B32B 18/00 428/131 |
| 2005/0013985 A1 * | 1/2005 | Thebault | ................ | B32B 18/00 428/304.4 |
| 2005/0158171 A1 * | 7/2005 | Carper | .................... | B32B 18/00 415/200 |
| 2006/0000591 A1 * | 1/2006 | Adams | ................ | H01L 23/3733 165/185 |
| 2006/0035024 A1 * | 2/2006 | Landini | ................. | C04B 35/573 427/249.2 |
| 2006/0147622 A1 | 7/2006 | Gray | | |
| 2006/0153685 A1 * | 7/2006 | Bolms | ................. | C23C 28/3215 416/224 |
| 2006/0280940 A1 * | 12/2006 | Kanka | ............... | C04B 35/62236 428/364 |
| 2007/0006445 A1 * | 1/2007 | Down | ....................... | F16C 3/02 29/596 |
| 2008/0022644 A1 * | 1/2008 | DeRosa | ................... | C04B 35/195 55/523 |
| 2008/0132398 A1 * | 6/2008 | Kostar | ..................... | C04B 35/80 501/1 |
| 2009/0071160 A1 * | 3/2009 | Keller | ..................... | F01D 9/023 60/753 |
| 2009/0275695 A1 * | 11/2009 | Shen | ....................... | C08G 77/06 524/588 |
| 2010/0021643 A1 * | 1/2010 | Lane | ....................... | F01D 5/282 427/376.2 |
| 2010/0081350 A1 * | 4/2010 | McCabe | ........... | C04B 35/62868 442/127 |
| 2010/0129636 A1 * | 5/2010 | Cybulsky | ............... | C04B 41/009 428/310.5 |
| 2010/0129673 A1 * | 5/2010 | Lee | ......................... | C09D 7/70 428/450 |
| 2010/0255289 A1 * | 10/2010 | Lewinsohn | ............ | C04B 35/195 428/325 |
| 2011/0071014 A1 * | 3/2011 | Kmetz | ................... | C04B 35/565 501/95.2 |
| 2011/0103940 A1 * | 5/2011 | Duval | ...................... | F01D 5/284 415/173.4 |
| 2011/0219775 A1 * | 9/2011 | Jarmon | ................. | C04B 35/573 60/753 |
| 2011/0268577 A1 * | 11/2011 | Bouillon | ................ | C04B 41/009 416/241 B |
| 2013/0004309 A1 * | 1/2013 | Sambasivan | .......... | C04B 35/195 415/208.1 |
| 2013/0022391 A1 | 1/2013 | Fisher, Jr. et al. | | |
| 2013/0039769 A1 | 2/2013 | Giannozzi et al. | | |
| 2013/0075119 A1 * | 3/2013 | Guo | ....................... | B23Q 15/12 173/1 |
| 2013/0084189 A1 * | 4/2013 | Diego | .................... | C04B 37/001 416/241 B |
| 2013/0108421 A1 * | 5/2013 | Sinatra | ................. | F01D 11/122 415/182.1 |
| 2013/0167374 A1 * | 7/2013 | Kirby | ..................... | C04B 35/64 29/888.02 |
| 2013/0196844 A1 | 8/2013 | Keller et al. | | |

(56) References Cited

U.S. PATENT DOCUMENTS

| | | | | |
|---|---|---|---|---|
| 2013/0224471 A1* | 8/2013 | Sheedy | .................. | C04B 41/81 428/312.6 |
| 2014/0050893 A1* | 2/2014 | Paige | ...................... | F01D 5/28 428/158 |
| 2014/0084521 A1* | 3/2014 | Sauder | ................... | B28B 7/342 264/640 |
| 2014/0255170 A1* | 9/2014 | Hillier | ..................... | F01D 5/284 415/174.2 |
| 2014/0261986 A1* | 9/2014 | Lazur | ...................... | F01D 5/282 156/189 |
| 2014/0271161 A1* | 9/2014 | Lazur | ...................... | F01D 5/282 415/200 |
| 2014/0272248 A1* | 9/2014 | Chamberlain | .......... | F01D 5/005 428/63 |
| 2014/0311163 A1* | 10/2014 | Uskert | ................... | F01D 5/282 60/806 |
| 2015/0040570 A1* | 2/2015 | Uskert | ................... | F01D 5/282 60/754 |
| 2015/0044054 A1* | 2/2015 | Loftus | ..................... | G01P 15/18 416/220 R |
| 2015/0247077 A1* | 9/2015 | Kepley | ................. | C09D 183/14 524/404 |
| 2015/0345388 A1* | 12/2015 | DiMascio | ............... | C04B 41/91 428/141 |
| 2015/0364667 A1* | 12/2015 | Jarmon | .................. | H01L 35/30 136/208 |
| 2016/0115086 A1* | 4/2016 | Tuertscher | ............ | C04B 35/573 264/29.1 |
| 2016/0177745 A1* | 6/2016 | Uskert | .................... | F01D 5/284 416/232 |
| 2016/0207836 A1* | 7/2016 | Land | ..................... | C01B 32/956 |
| 2016/0214907 A1* | 7/2016 | Shim | ..................... | C04B 41/009 |
| 2016/0229757 A1* | 8/2016 | McCaffrey | ............ | C04B 35/573 |
| 2016/0230570 A1* | 8/2016 | Harris | ............... | C04B 35/62863 |
| 2016/0236995 A1* | 8/2016 | Lai | ........................... | C04B 41/91 |
| 2016/0251972 A1* | 9/2016 | Dierberger | ................ | C23C 4/06 416/219 R |
| 2016/0265363 A1* | 9/2016 | McCaffrey | ................ | F01D 5/14 |
| 2016/0280607 A1* | 9/2016 | Land | ................... | C04B 35/571 |
| 2016/0326064 A1* | 11/2016 | Shim | .................... | C04B 35/565 |
| 2016/0348527 A1* | 12/2016 | Vetters | ...................... | F01D 9/04 |
| 2016/0348586 A1* | 12/2016 | Uskert | ...................... | B32B 5/18 |
| 2016/0356163 A1* | 12/2016 | Freeman | ................ | F01D 5/282 |
| 2016/0356499 A1 | 12/2016 | Freeman et al. | | |
| 2016/0368827 A1* | 12/2016 | Landwehr | ............ | C04B 35/565 |
| 2017/0015596 A1* | 1/2017 | Fisk | ...................... | B23K 20/02 |
| 2017/0016335 A1* | 1/2017 | Kirby | ...................... | F01D 5/147 |
| 2017/0159459 A1* | 6/2017 | Courcot | ................ | F01D 5/284 |
| 2017/0342844 A1* | 11/2017 | Schmidt | ................ | C03C 14/002 |
| 2018/0105471 A1* | 4/2018 | Shi | ........................ | C04B 35/565 |
| 2018/0252119 A1* | 9/2018 | Whalen | ................ | F01D 25/005 |
| 2018/0297346 A1* | 10/2018 | Aug | ........................ | B32B 37/12 |
| 2018/0363497 A1* | 12/2018 | Taxacher | .............. | F01D 25/005 |

OTHER PUBLICATIONS

Response to Office Action from U.S. Appl. No. 15/172,975, dated Nov. 29, 2018, filed Feb. 28, 2019, 6 pp.

Notice of Allowance from U.S. Appl. No. 15/172,975, dated Apr. 12, 2019, 9 pp.

Notice of Allowance from U.S. Appl. No. 15/172,975, dated Jul. 5, 2019, 8 pp.

\* cited by examiner

MACHINABLE CMC INSERT

CROSS REFERENCE TO RELATED APPLICATIONS

This application claims priority to and the benefit of U.S. Provisional Patent Application No. 62/171,280, filed 5 Jun. 2015, the disclosure of which is now expressly incorporated herein by reference.

FIELD OF THE DISCLOSURE

The present disclosure relates generally to ceramic matrix composite components, and more specifically to machinable inserts.

BACKGROUND

Gas turbine engine components are exposed to high temperature environments with an increasing demand for even higher temperatures. Economic and environmental concerns relating to the reduction of emissions and the increase of efficiency are driving the demand for higher gas turbine operating temperatures. In order to meet these demands, temperature capability of the components in hot sections such as blades, vanes, blade tracks, seal segments and combustor liners must be increased.

Ceramic matrix composites (CMCs) may be a candidate for inclusion in the hot sections where higher gas turbine engine operating temperatures are required. One benefit of CMC engine components is the high-temperature mechanical, physical, and chemical properties of the CMCs which allow the gas turbine engines to operate at higher temperatures than certain current engines.

SUMMARY

The present disclosure may comprise one or more of the following features and combinations thereof.

According to an aspect of the present disclosure, an assembly for use in a gas turbine engine is taught. The assembly may comprise a ceramic matrix composite, an insert, and a polymer char. The ceramic matrix component may have an exterior surface. The insert may be bonded to the exterior surface of the ceramic matrix composite component. The polymer char may be sandwiched between the monolithic insert and the exterior surface of the ceramic matrix composite component to bond the monolithic insert to the ceramic matrix composite component.

According to another aspect of the present disclosure, a method of joining an insert to a ceramic matrix composite component for use in a gas turbine engine is taught. The method may comprise providing a ceramic preform comprising silicon carbide fibers, depositing a pre-ceramic polymer along an exterior surface of the ceramic preform, positioning the insert along the exterior surface of the ceramic preform such that the pre-ceramic polymer is sandwiched between the ceramic preform and the insert, and heating the pre-ceramic polymer to form a polymer char that bonds the insert to the ceramic preform.

These and other features of the present disclosure will become more apparent from the following description of the illustrative embodiments.

DETAILED DESCRIPTION OF THE DRAWINGS

Figure 1:
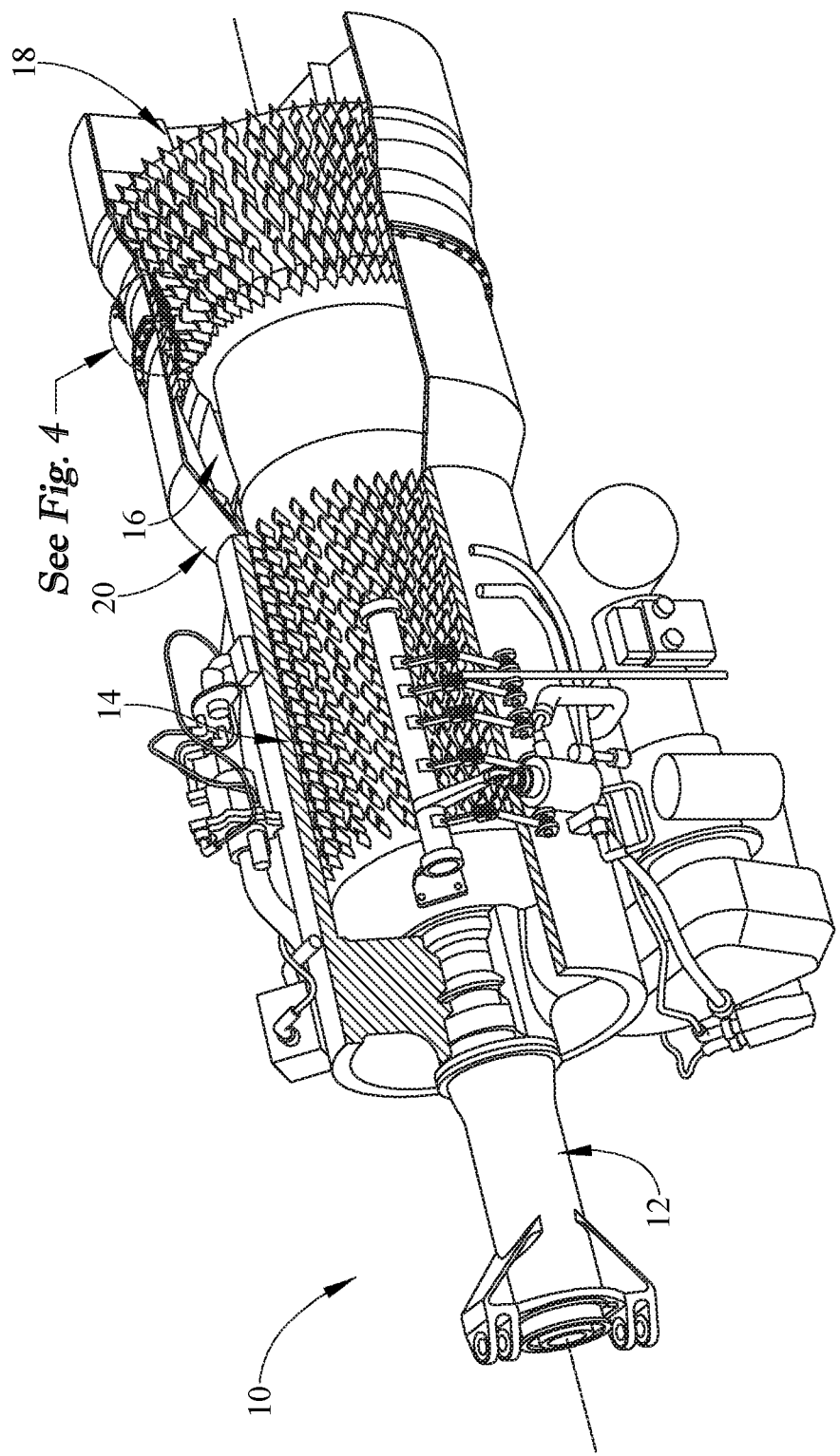
FIG. 1 is a cut-away perspective view of a gas turbine engine showing that the gas turbine engine includes a compressor section, a combustor section, and a turbine section that cooperate to drive an output shaft.

For the purposes of promoting an understanding of the principles of the disclosure, reference will now be made to a number of illustrative embodiments illustrated in the drawings and specific language will be used to describe the same.

As shown in FIG. 1, an illustrative aerospace gas turbine engine 10 may include an output shaft 12, a compressor section 14, a combustor section 16, and a turbine section 18 mounted to a case 20. The output shaft 12 may be coupled to a propeller (not shown) and may be driven by the turbine section 18. The compressor section 14 may compress and deliver air to the combustor section 16. The combustor section 16 may mix fuel with the compressed air received from the compressor section 14 to ignite the fuel. The hot high pressure products of the combustion reaction in the combustor section 16 may be directed into the turbine section 18 and the turbine section 18 may extract work to drive the compressor section 14 and the output shaft 12 as suggested in FIG. 1.

The hot sections of the gas turbine engine 10 may benefit from the use of CMC components. CMC components may allow for higher operating temperatures and greater efficiencies. CMC components may need to be machined to fit the tight tolerance requirements. The ability to meet the tight tolerance requirements may allow reduced thickness of coatings and abradable coatings that would otherwise be needed to achieve the tight tolerance requirements. Machining of the CMC component may lead to environmental attack of the CMC component. Machining of a CMC component may lead to cut fibers. The cut fibers may cause the fibers to be exposed to the environment. In some instances, the cut fibers may cause the CMC component to have a lower tolerance when compared a CMC component with unexposed, uncut fibers. The machining and exposure of the fibers may result in cracks throughout the CMC component.

Figure 2:
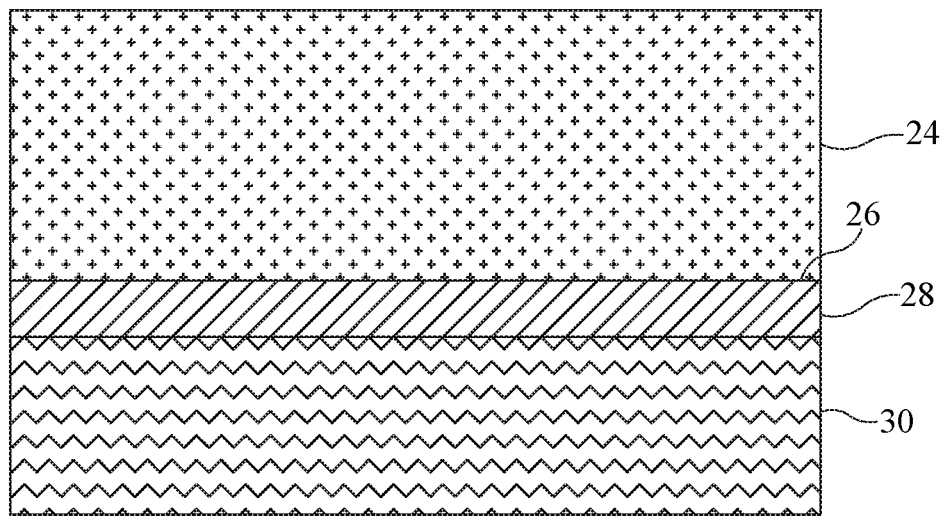
FIG. 2 is a schematic of a structural component, a metallic component, and an insert sandwiched between the structural component and the metallic component.

An illustrative assembly 10 for use in a gas turbine engine 10 may allow for machining a CMC component without attacking the fibers. As shown in FIG. 2, the assembly 10 may include a structural component 24 having an exterior surface 26, a metallic component 30 spaced apart from the structural component 24, and a sacrificial layer or insert 28 bonded to the exterior surface 26 of the structural layer 24 and sandwiched between the metallic component 30 and the structural component 24. The structural component 24 described herein may include a CMC component. The structural component 24 may form a blade track, a vane, a blade, a combustor, a combustor tile, a faring, an exhaust tail cone, an exhaust liner flap, or the like for use in a gas turbine engine 10. The insert 28 may provide a machinable surface to reduce machining of the CMC structural component 24 during the machining process. In the absence of insert 28, machining of the structural component 24 may result in exposed fibers in the structural component 24.

The structural component 24 may be substantially homogenous and may include Si-containing ceramic such as silicon carbide (SiC) or silicon nitride ($Si_3N_4$); boron carbide ($B_4C$), zirconium diboride ($ZrB_2$), molybdenum carbide ($Mo_2C$) or a similar silicon containing material. In other examples, Structural component 24 may include a metal silicide, such as a molybdenum-silicon alloy (e.g., $MoSi_2$) or a niobium-silicon alloy (e.g., $NbSi_2$). The structural component 24 may include a matrix material and a reinforcement material. The matrix material may include a ceramic material such as SiC, $Si_3N_4$, $B_4C$, $ZrB_2$ $Mo_2C$ or the like. In some examples, the reinforcement material may include a continuous monofilament or multifilament weave. The reinforcement material may include SiC, $Si_3N_4$, or the like.

The structural component 24 may include fibers as described above, which may be coated with boron nitride, pyrolytic carbon, oxide interface coating, or the like. The structural component 24 may be a 2D laminate, a 3D weave, or any other composite structure.

Figure 9:
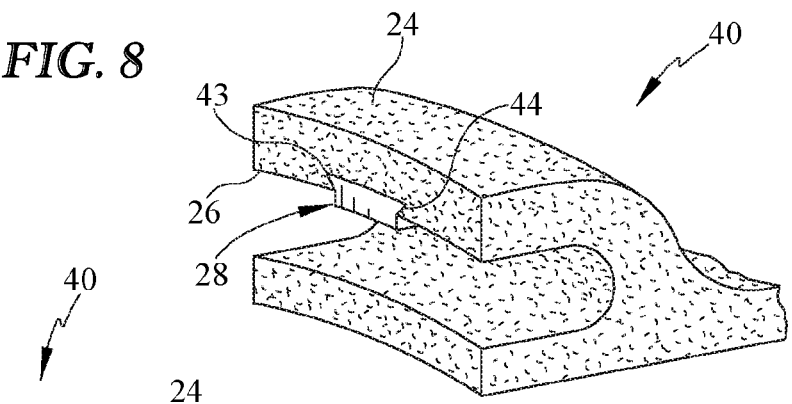
FIG. 9 is a detail view of an insert adapted to include a dovetail post arranged to mate with a recess along the exterior surface of the blade track segment.

As shown in FIG. 2, the structural component 24 includes an exterior surface 26. The exterior surface 26 of the structural component 24 may be substantially bonded to the insert 28. The exterior surface 26 may be a chemically homogenous surface for bonding the insert 28. The exterior surface 26 may include various recesses and protrusions for holding, bonding, or joining with the insert 24. The geometry of the exterior surface 26 may be determined based on the use of the structural component 24 within the gas turbine engine 10. As shown in FIG. 9 the insert 28 may cover the entire area of the structural component 24. As shown in FIGS. 6-7 and 10-12 the insert 28 may cover only a portion of the structural component 24.

The insert 28 may be bonded to the exterior surface 26 of the structural component 24 and may be sandwiched between the CMC component 24 and the metallic component 30. The insert 28 may be bonded to the exterior surface of the structural component 24 to prevent degradation and cutting of the fibers of the structural component 24 during machining the assembly to the final specifications for use in a gas turbine engine. Machining of the ceramic fibers of the structural component 24 may result in cracks and reduced tolerance requirements, so machining the insert 28 instead of the structural component 24 may be beneficial.

The insert 28 may include ceramic materials, powder, or resin char. The ceramic materials of the insert 28 may include chopped carbon fibers, chopped silicon carbide fibers, or the like. The insert 28 may be between about 0.005 inches thick and about 0.04 inches thick depending on the location of the insert 28 within the gas turbine engine 10.

Figure 3:
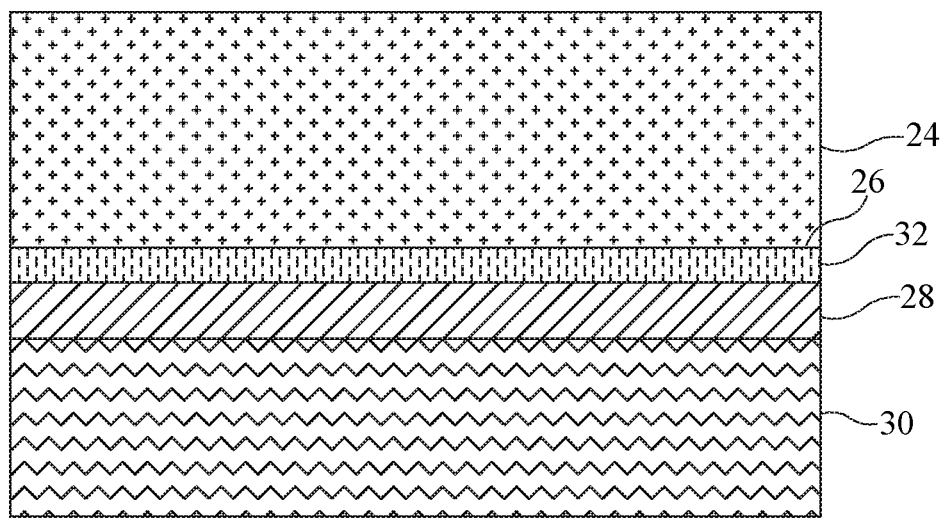
FIG. 3 is a schematic of a structural component, a metallic component, and an insert including a polymer char sandwiched between the insert and the structural component.

As shown in FIG. 3, in some examples the assembly 20 may further include a polymer char 32 or resin char sandwiched between the insert 28 and the structural component 24. The polymer char 32 may be pre-ceramic polymer resin char. A polymer char may be a solid ceramic material that forms when the pre-ceramic polymer is heat treated at an elevated temperature. The polymer char 32 may be joined using an adhesive to a pre-ceramic component and infiltrated, as described below, to bond the insert 28 to the structural component. The polymer char 32 may form a continuous ceramic matrix between the structural component 24 and the insert 28 such that the resin char may substantially bond or join the structural component 24 and the insert 28. The polymer char 32 may include silicon, carbon, silicon carbide, a binding agent, oxycarbide silicon oxynitride, silicon nitride, or the like. The polymer char 32 may include ceramic fibers. The ceramic fibers may include chopped fibers, woven fibers, unwoven fibers, or the like.

In some examples, the insert 28 may be a resin char insert. The resin char insert may be formed from a polymer char, such as the polymer char 32 described above. The resin char insert may be substantially formed from the polymer char 32 to bond the insert 28 to the structural component 24, according to the method described below. The resin char insert may form a continuous ceramic matrix between the structural component 24 and the resin char insert subsequent to infiltration and heating of the resin char to form the polymer char as described below. The polymer char 32 may include silicon, carbon, silicon carbide, a binding agent, oxycarbide silicon oxynitride, silicon nitride, or the like. The polymer char 32 may include ceramic fibers. The ceramic fibers may include chopped fibers, woven fibers, unwoven fibers, or the like.

In some examples, the insert 28 may include silicon, silicon carbide. The structural component 24 and the insert 28 may be placed in a preform tool prior to infiltration with silicon metal, silicon alloy or the like. The structural component 24 and the insert 28 may be co-infiltrated with silicon metal, silicon alloy, or the like to form the continuous, uninterrupted silicon carbide matrix between the structural component 24 and the insert 28 to bond or join the structural component 24 and the insert 28.

The insert 28 or sacrificial layer may comprise ceramic fibers. The ceramic fibers may include silicon carbide fibers, silicon fibers, or the like. The ceramic fibers of the insert 28 may be unarranged fibers. Unarranged fibers may be unwoven, loosely braided, chopped fibers, or the like. The ceramic fibers of the insert 28 may be substantially woven fibers which may remain woven, or may be chopped after weaving of the fibers.

Figure 11:
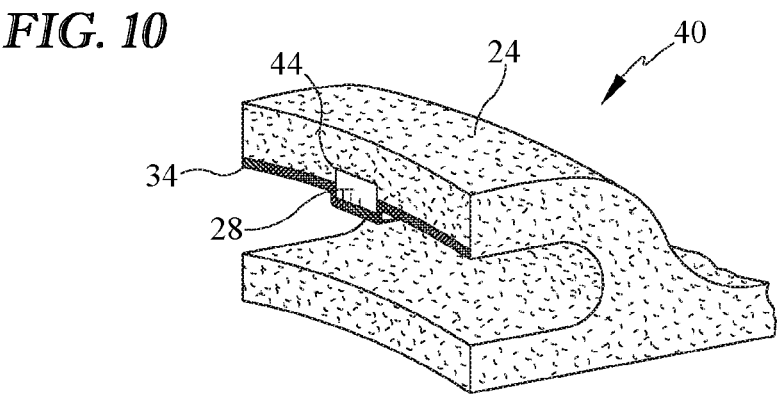
FIG. 11 is a detail view of an insert and a portion of the blade track substantially covered by a ply such that the insert sandwiched between the ply and the blade track.

As shown in FIG. 11, in some examples, the insert 28 may be partially or substantially covered by a ply 34 such that the insert 28 is sandwiched between the ply 34 and the structural component 24. The ply 34 may extend beyond the insert 28 in at least one direction so that the ply 34 is joined to the insert 28 and the structural component 24. The ply 34 may be at least one layer of ceramic fibers. The ply 34 of fabric may be applied to the insert 28 and the structural component 24 prior to slurry infiltration, such that the ply 34 is further bonded to the insert 28 and structural component 24 after infiltration. The ply 34 may be bonded to the insert 28 and the structural component 24 by an organic tacky agent such as PVA may assist with adhering the ply to stick to the insert 28 to allow for infiltration of the ply 34, the inset 28, and the structural component 24. The infiltration of the silicon metal may form a silicon carbide matrix which may extend from the structural component 24 to the ply 34 to bond the Structural component 24, the insert 28, and the ply 34 together.

In some examples, the ply 34 may include a layer of woven silicon carbide fiber. A second layer of silicon carbide fiber may be placed on the first silicon carbide fiber to form a weave or fabric of silicon carbide fibers. Any suitable number of layers of silicon carbide fibers may be used to provide the desired protection to the insert 28 and the structural component 24. The ply 34 or an exterior layer of the ply 34 may be locally machined away instead of machining of the fibers of the structural component 24. In some examples, an additional ply may be placed between the insert 28 and the structural component 24 to assist with bonding or joining the insert 28 and the structural component 24.

In some examples, the ceramic fibers may be coated with boron nitride, a CVD pyrolytic carbon coating, a silicon doped boron nitride coating, or the like. In other examples, the ceramic fibers may be substantially uncoated. The substantially uncoated fibers may not undergo the CVI process infiltration process as described below and may be bare silicon carbide fibers. Fibers without the boron nitride coating may be more easily machined and may provide less environmental attack on the insert 28 or the structural component 24.

In some examples, the volume fiber fraction of the insert 28 may be lower than the volume fiber fraction of the structural component 24. The volume fiber fraction may be the volume of fibers as a fraction of the total volume of the component. The lower volume fiber fraction of the insert 28 may allow for fewer fibers to be machined away during the machining process to prevent cracking and reduction in tolerance of the structural component 24. The lower volume fiber fraction of the insert 28 may also allow for improved infiltration of the structural component 24.

In some examples, the insert 28 may include a powder and/or a binding agent. The powder to form the insert 28 may include silicon carbide, silicon, or any ceramic containing powder. The powder may be a loose powder or a pressed powder. The pressed powder may be pressed into a compact of the final shape of the insert. The powder may be infiltrated with silicon metal to produce a silicon carbide-silicon carbide matrix throughout both the insert 28 and the structural component 24. The powder may include a binding agent such as a polymeric binder to assist with binding the insert 28 to the structural component 24. In some examples, the insert 28 may be a powder referred to as a green body ceramic. A green body ceramic may be an un-infiltrated ceramic component including loose or compact silicon carbide powder, which may be infiltrated to form a silicon carbide-silicon carbide matrix.

In some examples, the insert 28 may include reticulated foam or a material of substantially continuous porosity. Continuous porosity may be a permeable structure with open cells for infiltrating materials. The insert 28 may be a ceramic foam including silicon, silicon carbide, or the like. The reticulated foam may have a porosity of between about 10% and about 90% by volume such that it may be infiltrated in subsequent densification steps to bond the insert 28 to the structural component 24. The continuous porosity may allow gas or liquid phase silicon to infiltrate into the pores during infiltration steps. The reticulated foam may be machinable such that fibers of the structural component 24 are not exposed during the machining step.

Figure 4:
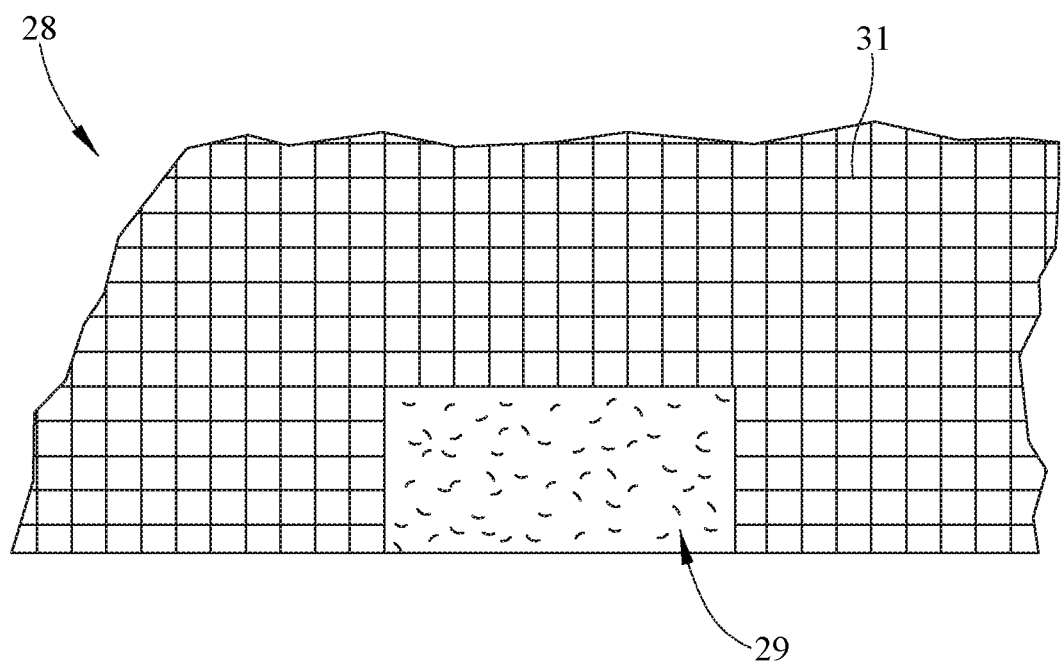
FIG. 4 is a schematic view of a woven fibers of a structural component and the chopped fibers of the insert.
Figure 10:
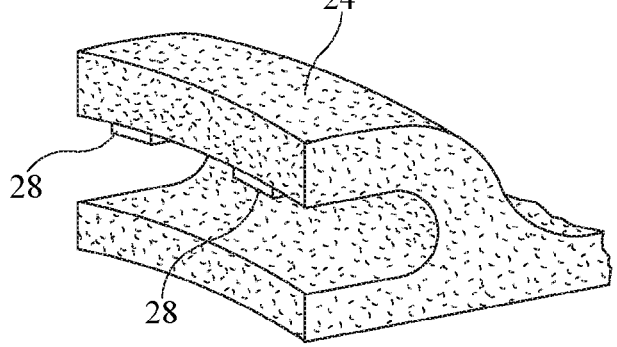
FIG. 10 is a detail view of multiple inserts arranged along the exterior surface of the blade track.

As shown in FIG. 4, the insert 28 may include a needle punched layer. The needle punched layer 29 may include woven fibers 31, unwoven fibers 29, or a combination of woven and unwoven fibers. The needle may punch through the layer of fibers to provide chopped fibers. The fibers may be coated with boron nitride, or the fibers may be substantially uncoated prior to needle punching. The needle punched insert may have a lower fiber fraction volume to allow for improved infiltration of the structural component 24. In some examples, the insert 28 may include chopped fiber. As shown in FIGS. 4 and 10, at least one insert 28 may be positioned along the exterior surface of the blade track segment 40. The insert 28 may include chopped fibers. The fibers may be chopped by any number of methods including needle punching as described below. As shown in FIG. 4, the blade track segment 40 may include woven fibers. The woven fibers may be arranged in any number of weaves including a 0 degree, 90 degree weave, a five point satin harness, a 7 point satin harness or any of the weaves described herein. The chopped fiber insert 28 may include a lower volume fiber fraction compared to the blade track segment 40. In several of the examples below the structural component 24 is a blade track segment 40.

Figure 5:
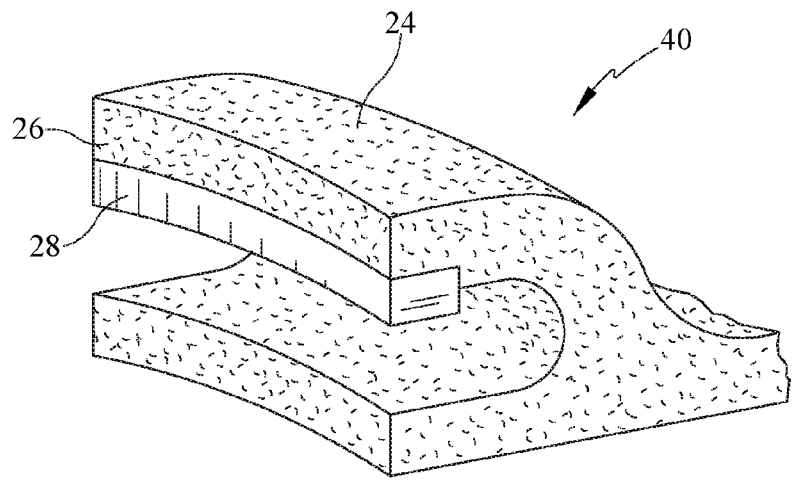
FIG. 5 is a diagrammatic view of an insert extending entirely across the exterior surface of a blade track segment.
Figure 6:
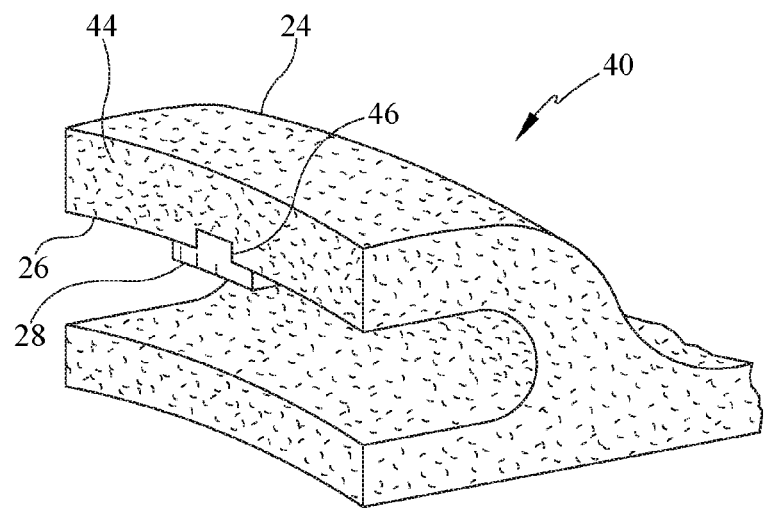
FIG. 6 is a detail view of an insert adapted to mate with a recess along exterior surface of a blade track segment, the insert including a protrusion for interlocking with the recess of the blade track segment.

As shown in FIG. 5, the insert 28 may extend entirely across in at least one direction of the exterior surface 26 of the structural component 24 such as the blade track segment 40. As shown in FIG. 6, in some embodiments, insert 28 may cover only a portion of the exterior surface 26 of the blade track segment 40. The desired area of coverage for the insert may be determined by the machining and tolerance requirements of the final component.

Figure 7:
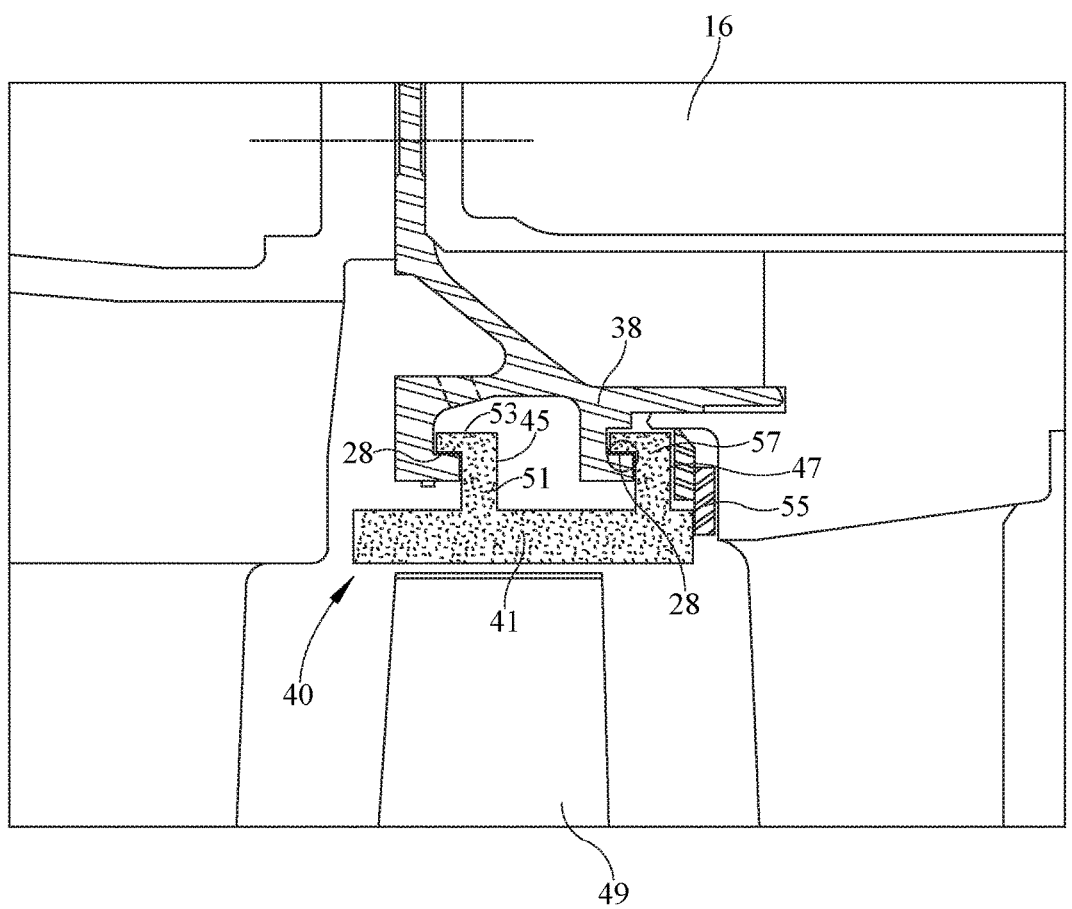
FIG. 7 is a cross-sectional view of the turbine shroud of FIG. 1 showing the ceramic blade track held in place by a metallic carrier.

As shown in FIG. 7, the insert 28 may be sandwiched between a carrier 38 and a blade track segment (sometimes called a seal ring) 40. The carrier 38 may be an annular, metallic component and may support the blade track segment 36 in position adjacent to the blades of the turbine wheel assembly. The blade track segment 40 may include a runner 41, a forward attachment arm 45 and an aft attachment arm 47 as shown. The runner 41 may extend around a turbine wheel assembly to block gasses from passing over the turbine blades without pushing the blades 49. The forward attachment arm 45 may have a radially-extending portion 51 and may have an axially-extending portion 53.

The aft attachment arm 47 may have a radially-extending portion 55 and an axially-extending portion 57 for attaching to the carrier 32. The blade track segment 40 may include silicon containing ceramic fibers and a reinforcement matrix as described herein. The blade track 41 may include or be formed of a silicon-carbide/silicon-carbide ceramic matrix composite The insert 28 may be sandwiched between the carrier 38 and the blade track 40 in any number of configurations with examples described below.

As shown in FIG. 6, the insert 28 and the blade track segment 40 may be joined by a recess 44 along the exterior surface 26 of the blade track segment 40. The recess 44 may be adapted to include any geometry for holding the insert 28. The insert 28 may include a protrusion 46 for mating with the recess 44 of the blade track segment 40. The protrusion 46 may be formed of the same material as the insert 28 such that the protrusion 46 is an extension of the insert 28.

Figure 8:
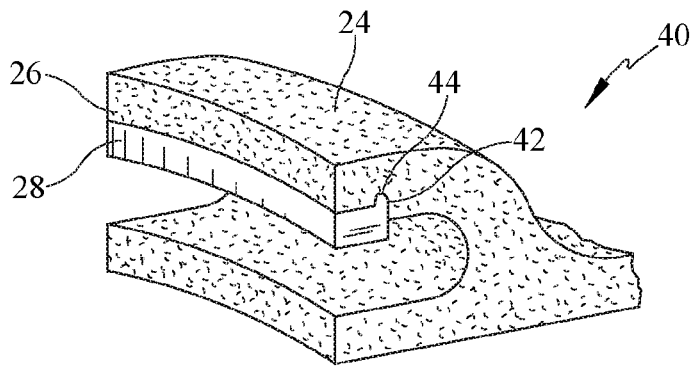
FIG. 8 is a detail view of an insert adapted to include a positioning tab for mating the insert with a recess along the exterior surface of the blade track segment.

As shown in FIG. 8, in some embodiments the insert 28 may include a positioning tab 42 for mating the insert 28 with a recess 44 of the blade track segment 40. The positioning tab 42 may assist with "locking" the insert 28 in the blade track segment 40 such that the components will not become separated during use of the assembly. The positioning tab 42 may assist with reducing axially movement of the insert 28 after infiltration and processing as described herein. In some examples, the positioning tab 42 may assist with locating the insert 28 along the blade track segment 40. The recess 44 of the of the blade track segment 40 may be made in the blade track segment 40 when the fibers are arranged and laid up to form the ceramic preform component described above.

As shown in FIG. 9, in some examples the insert may include a dovetail post 43 arranged to mate with the recess 44 of the blade track segment 40. The dovetail post 43 may allow the insert 28 to be locked into the blade track segment 40 to prevent movement of the insert 28. As described below with regard to FIG. 11, an overwrap or ply 34 may not be included when the insert 28 includes the dovetail post 43. The recess 44 of the of the blade track segment 40 for holding the insert 28 may be made in the blade track segment 34 when the fibers are arranged and laid up to form the ceramic preform component described above.

As shown in FIG. 10, in some examples a plurality of inserts 28 may be used. A plurality of inserts 28 may be used when a plurality of locations along an exterior surface of a blade track 40 may require machining. The inserts 28 may be placed in locations which may require machining to achieve the necessary tolerance requirements for the blade track 40. The inserts 28 may be placed at any location along the blade track 40 or component.

As shown in FIG. 11, in some examples, the insert 28 and a portion of the blade track 40 may be partially or substantially covered by a ply 34 such that the insert 28 is sandwiched between the ply 34 and the blade track 40. The ply 34 may extend beyond the insert 28 in at least one direction so that the ply 34 is joined to the insert 28 and the structural component blade track 40. The ply 34 may include at least one layer of ceramic fibers as described above.

Figure 12:
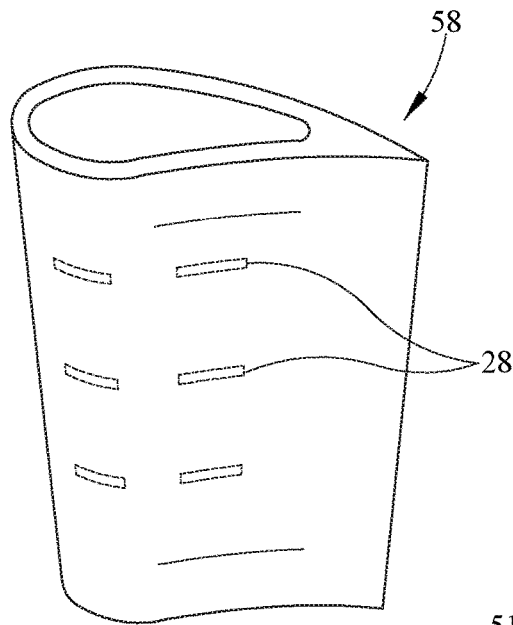
FIG. 12 is a diagrammatic view of a vane with an insert or sacrificial layer on the exterior surface of the vane for machining.
Figure 13:
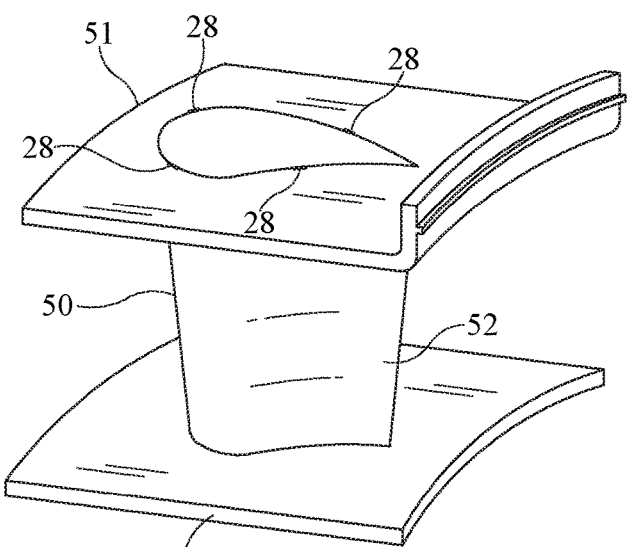
FIG. 13 is a diagrammatic view of a blade including an airfoil extending between an outer and inner platform including inserts or a sacrificial layer for machining.

In some examples, the structural component 24 may include an airfoil such as a blade 50 as shown in FIG. 13 or a vane 58 as shown in FIG. 12. The blade 58 adapted for use in a turbine section of a gas turbine engine includes an airfoil 52. The airfoil 52 extends between outer and inner platforms 54, 56 of the blade 50. Although only one airfoil 52 is shown to extend between the platforms 54, 56 in FIG. 13, a plurality of airfoils 52 may extend between the annular platforms 54, 56. The plurality of airfoils 52 are circumferentially spaced such that the airfoils 52 and the platforms 54, 56 cooperate to direct fluid flowing through the turbine section toward downstream sections of the gas turbine engine. The insert 28, or sacrificial layer described above, may be positioned along an exterior surface of the vane to provide a sacrificial layer for machining. The sacrificial layer for machining may allow the airfoil structure to be tightly machined to fit the geometrical tolerances.

Figure 14:
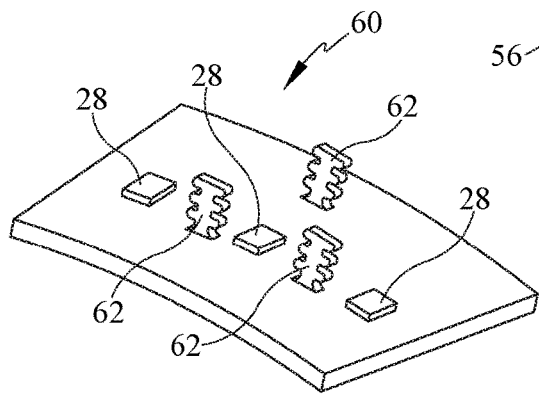
FIG. 14 is a diagrammatic view of a combustor tile adapted to include a plurality of inserts and attachment features.

As shown in FIG. 14, in some examples, the structural component 24 may include a combustor tile 60. The combustor tile 60 may be constructed of a ceramic matrix composite material. The combustor tiles 60 may be arranged around the circumference of an outer or inner shell of the combustor. The combustor tile 60 may include a plurality of inserts 28 and attachment features 62 to space the combustor tile 60 off of an exterior full-hoop liner. The attachments 62, shown in FIG. 14, are depicted as fir-tree attachments, but dovetail attachments or any other suitable attachment may be used. The inserts 28 and attachment features 62 may be processed with the combustor tile 60, as described below, and may then be machined to become retention features. The inserts 28 may be used to position or locate the combustor tile 60 off of an outer full-hoop liner.

Figure 15:
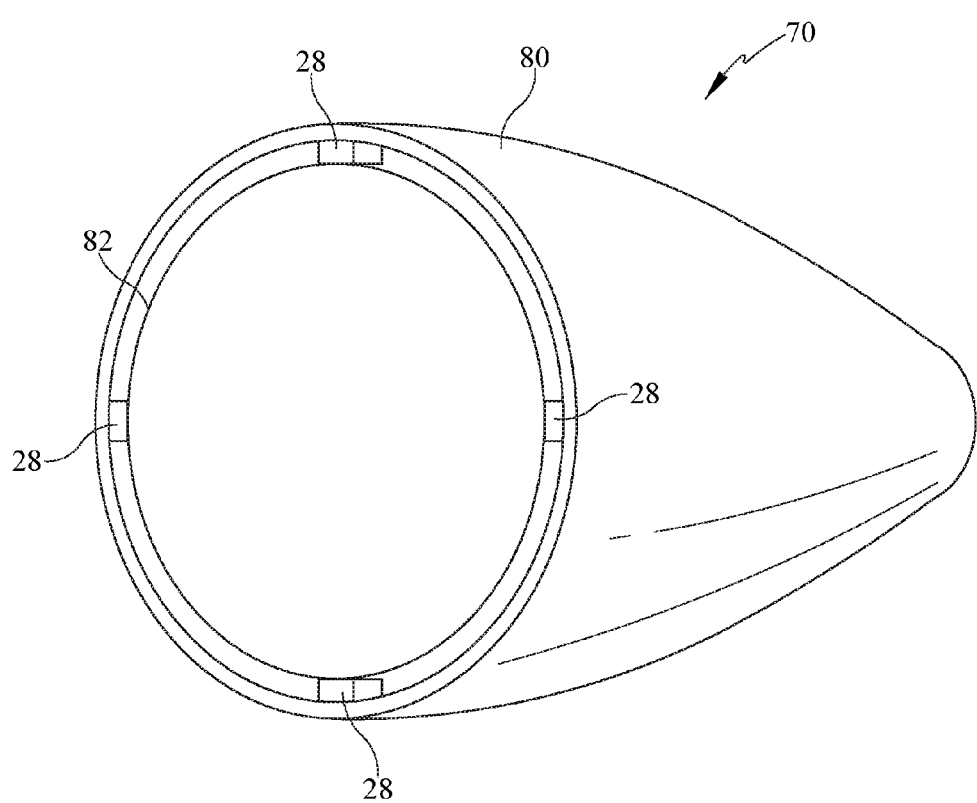
FIG. 15 is a diagrammatic view of an aerodynamic exhaust tail with an inner wall and an outer wall separated by a plurality of machinable inserts.

As shown in FIG. 15, in some examples the structural component 24 may include an exhaust cone 70. The insert 28 may be placed between an outer wall 80 and an inner wall 82, where the outer wall 80 and the inner wall 82 may have differing coefficients of thermal expansion. The insert 28 may be machined to fit between the two walls 80, 82 to allow for a greater tolerance of thermal expansion than would otherwise be permitted with two differing materials.

An illustrative method for joining the insert to the structural component described herein may include providing a ceramic preform comprising silicon carbide fibers. The ceramic preform may form the structural component 24 according to the methods described below.

Figure 16:
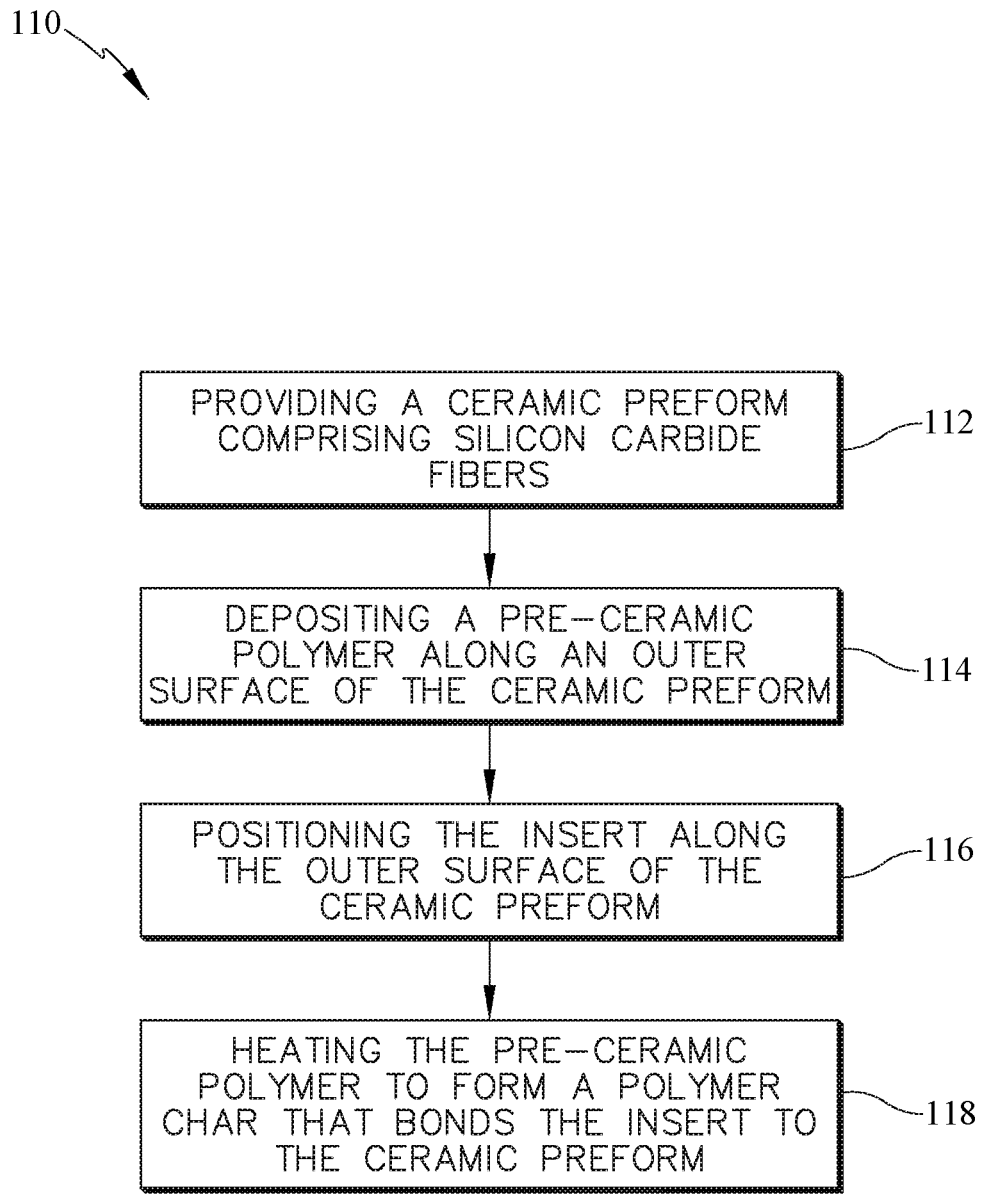
FIG. 16 is a block diagram depicting the method of joining the insert to the structural component including a pre-ceramic polymer.

As shown in FIG. 16, an illustrative method 110 for joining an insert to a structural component is provided. According to a step 112 of the method 110, a ceramic preform comprising silicon carbide fibers is provided. The ceramic preform may be produced according to any of the methods described below.

In a step 114 of the method 110, a pre-ceramic polymer may be deposited along an exterior surface of the ceramic preform. The pre-ceramic polymer may be added as an adhesive, which may form the char after heat treating. The pre-ceramic polymer may be pre-ceramic polymer resin char. The pre-ceramic polymer may form a solid ceramic material when the pre-ceramic polymer is heated to an elevated temperature. In some embodiments, the polymer char may be joined to the structural component preform using an adhesive. The adhesive may bond the insert to the structural component for infiltration. The polymer char may include pre-ceramic phases, silicon carbide, transition metals, transition metal borides, transition metal silicides or combinations thereof. In some examples, the pre-ceramic polymer may include carbon-based polymer systems such as phenolic resin and furfuryl alcohol resin. The char may have similar chemical properties to the pre-ceramic polymer with the some of the chemical elements removed by the heating process. The elements which may be removed may include hydrogen, oxygen, and nitrogen. Specifically the pre-ceramic material may include SMP-10™, a silicon carbide matrix precursor sold by Starfire Systems, or other precursors with similar properties to SMP-10. In a step 116 of the method 110, the insert is positioned along the exterior surface of the ceramic preform. The insert is positioned such that the pre-ceramic polymer is sandwiched between the ceramic preform and the insert. In a step 118 of the method 110 the pre-ceramic polymer is heated to form a polymer char that bonds the insert to the ceramic preform.

The insert may be co-infiltrated with the structural component preform using chemical vapor infiltration, chemical vapor deposition, slurry infiltration, melt infiltration, polymer impregnation and pyrolysis or any combination as described below. The pre-ceramic polymer may be heated in a furnace and/or may be heated through the infiltration processes. Heating of the pre-ceramic polymer may be performed through the processes of CVI, SMI, or brazing. As the pre-ceramic polymer is heated the pre-ceramic polymer may form a ceramic matrix which may extend to the structural component preform to join the insert and the structural component. The pre-ceramic polymer char may be heated to a temperature between about 1300° C. and about 1500° C. to form the polymer resin char.

Figure 17:
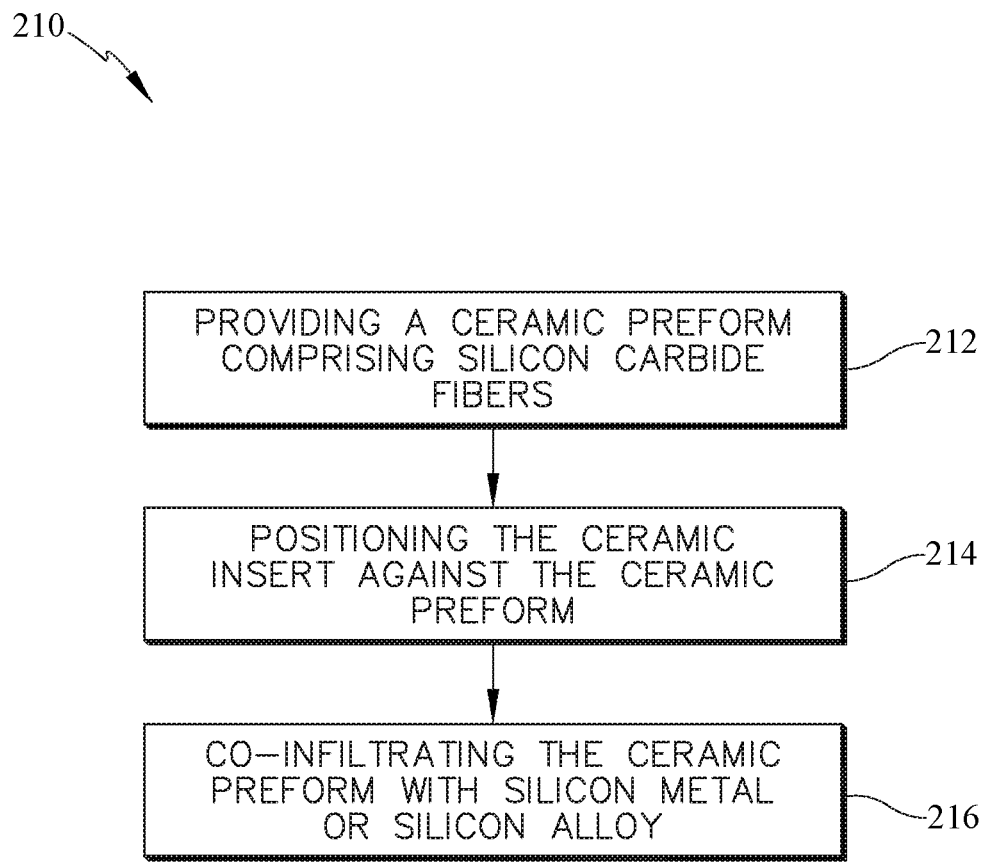
FIG. 17 is a block diagram depicting the method of joining the insert to the structural component including co-infiltrating the insert and the structural component.

As shown in FIG. 17, an illustrative method for joining an insert to a ceramic matrix composite structural component is described in method 210. According to a step 212 of the method 210, a ceramic preform comprising silicon carbide fibers is provided. The ceramic preform comprising silicon carbide fibers may be provided according to the methods described above.

In a step 214 of the method 210, the ceramic insert is positioned adjacent to the ceramic preform. The ceramic insert may be positioned such that the insert and the preform are held together in a tool prior to infiltration. In some embodiments the insert may be positioned within a recess along the surface of the ceramic preform. In some embodiments, the ceramic insert may be adhered to the ceramic preform using an adhesive to join the ceramic insert and ceramic preform prior to infiltration.

In a step 216 of the method 210, the insert and the ceramic preform may be co-infiltrated with a silicon metal or silicon alloy to form a silicon carbide matrix extending from within the ceramic preform to within the insert thereby joining the insert to the ceramic preform. The step of co-infiltrating the ceramic preform and the insert may include chemical vapor infiltration, chemical vapor deposition, slurry infiltration, melt infiltration, polymer impregnation and pyrolysis, or a combination thereof. The steps of infiltrating with silicon metal or silicon alloy are described above.

In some embodiments, the insert may comprise a powder such as silicon, silicon carbide, or a combination thereof. The powder may be pressed to form the insert. The powder may be pressed into a compact via either cold pressing or hot pressing of the powder. In some embodiments, a polymeric binder may be added to the powder to assist with formation of the insert.

Figure 18:
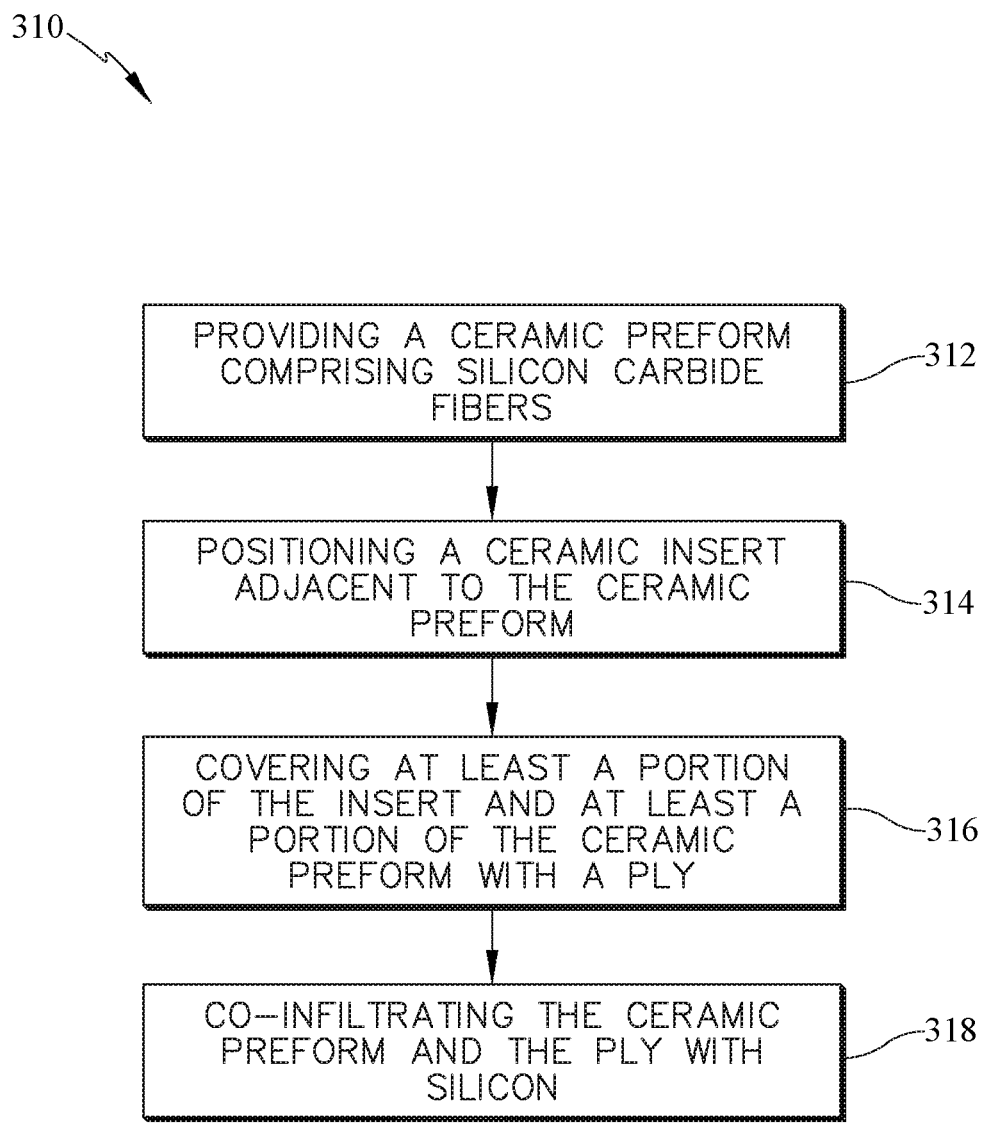
FIG. 18 is a block diagram depicting the method of joining the insert and the structural component including covering a portion of the insert and the structural component with a ply.

As shown in FIG. 18, an illustrative method 310 for joining an insert to a ceramic matrix composite structural component is provided. According to a step 312 of the method 310, a ceramic preform comprising silicon carbide fibers is provided. The ceramic preform comprising silicon carbide fibers may be produced according to any of the methods described above.

In a step 314 of the method 310, a ceramic insert is positioned adjacent to the ceramic preform. The ceramic insert may be positioned such that the insert and the preform are held together in a tool prior to infiltration. In some embodiments, the insert may be positioned within a recess along the surface of the ceramic preform. The ceramic insert may be adhered to the ceramic preform using an adhesive or tacky agent to join the ceramic insert and ceramic preform prior to infiltration.

In a step 316 of the method 310, at least a portion of the insert and at least a portion of the ceramic preform may be covered with a ply. The ply may be a fabric laid into the CVI tool. The insert may then be laid on top of the within the tool such that the insert may be sandwiched between the ply and the ceramic preform prior to infiltration. The ply may comprise at least one layer of silicon carbide fibers. The ply may be any suitable number of silicon carbide fibers to achieve the thickness desired for the insert. In a step 318 of the method 310, the ceramic preform and the ply may be co-infiltrated. Co-infiltrating may be performed according to the methods described above. Co-infiltrating of the ply, the insert and the structural component may provide more complete consolidation of the component.

Figure 19:
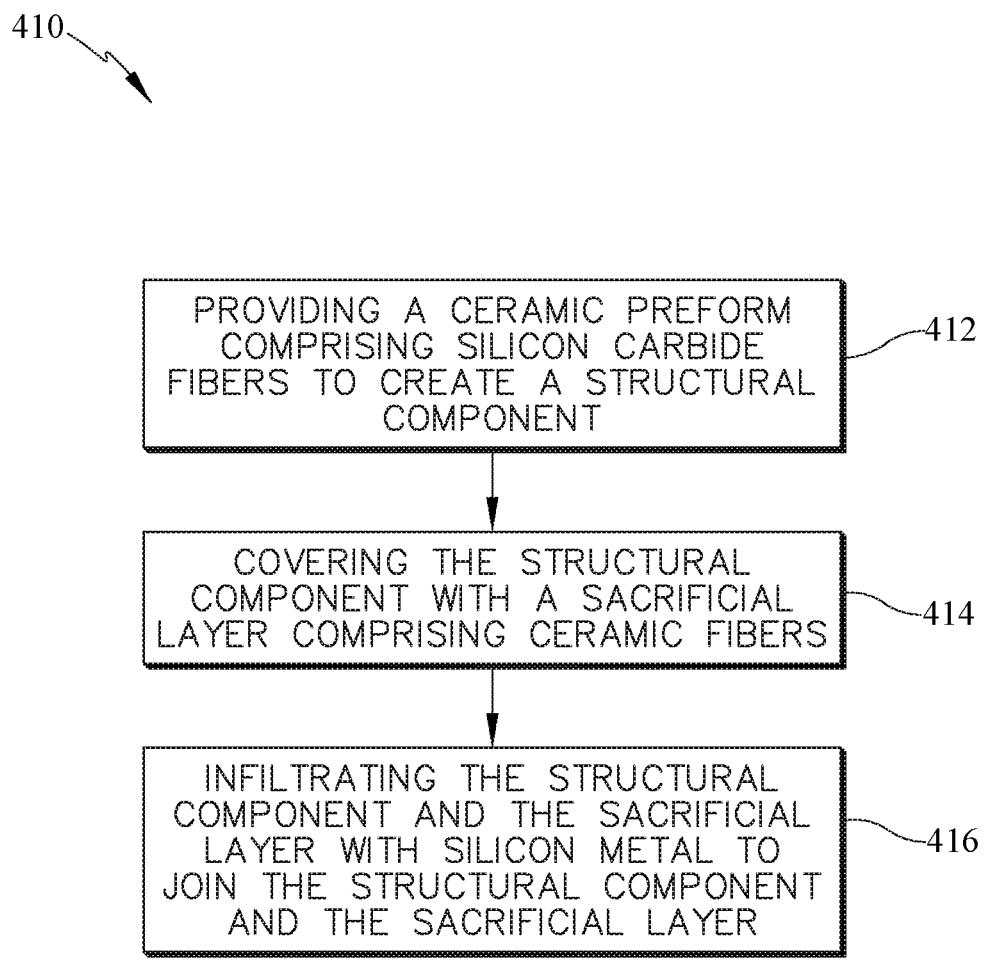
FIG. 19 is a block diagram depicting the method of joining the sacrificial layer or insert with the structural component.

As shown in FIG. 19, an illustrative method 410 for joining an insert to a ceramic matrix composite structural component is provided. According to a step 412 of the method 410, a ceramic preform comprising silicon carbide fibers is provided. The ceramic preform comprising silicon carbide fibers may be produced according to the methods described above.

In a step 414 of the method 410, the structural component and the insert or sacrificial layer may be infiltrated with silicon metal or silicon alloy to join the insert and the structural component. The infiltration may be performed via chemical vapor infiltration, chemical vapor deposition, slurry infiltration, melt infiltration, polymer impregnation and pyrolysis, or a combination thereof. The steps of infiltrating with silicon metal or silicon alloy are described above. The infiltration with silicon metal or silicon alloy may produce a ceramic matrix which may extend form the structural component to the insert or sacrificial layer.

The structural component and the insert may be formed according to the methods described below. Chemical vapor deposition (CVD) or chemical vapor infiltration (CVI) (CVD and CVI collectively referred herein as CVI) may be used to build up one or more layers on the ceramic fibers of the structural component preform. The one or more layers may include a silicon carbide layer. Furthermore, one or more intermediate layers such as boron nitride may be deposited prior to the silicon carbide layer. CVD may follow the same thermodynamics and chemistry. CVI and CVD may be non-line of sight processes process such that deposition can occur on the ceramic fibers that are within or internal to the preform. Furthermore, such CVI and CVD may occur completely within a furnace. The starting material for CVI may include a gaseous precursor controlled by quartz tubes and may be performed at temperatures between about 900° C. and about 1300° C. CVI may be performed at a relatively low pressure and may use multiple cycles in the furnace. Silicon carbide may also be deposited to build up one or more layers on the fibers while the preform is in the furnace. The silicon carbide may provide additional protection to the fibers and may also increase the stiffness of the structural component preform. In some examples, boron nitride may be deposited prior the silicon carbide to provide further beneficial mechanical properties to the fibers. The preform may be taken out of the furnace after a deposition and weighed. If the preform is not at the target weight it may go through the furnace for another run, which may occur as many times as necessary in order to achieve the target weight. The target weight may be determined by the final part to be made. CVI may form a preform with a porosity of between about 40% and about 50%. If the preform is at the target weight, the part may undergo slurry infiltration.

Once the structural component preform fibers are coated via CVI, additional particles may be infiltrated into the preform via other infiltration methods. For example, a slurry infiltration process may include infiltrating the preform with slurry. Dispersing the slurry throughout the preform may include immersing the preform in the slurry composition. The slurry may include particles of carbon and/or silicon carbide. The slurry may flow into the spaces, pores, or openings between the fibers of the preform such that the slurry particles may uniformly impregnate the pores of the preform and reside in the interstices between the preform fibers. The slurry infiltration process may form a preform with a porosity of between about 35% and about 45%.

Prior to immersion, the preform fibers may optionally be prepared for slurry infiltration by exposing the fibers to a solution including, for example, water, solvents, surfactants and the like to aid impregnation of the fibers. Optionally, a vacuum may be drawn prior to slurry introduction to purge gas from the preforms and further enhance impregnation. Slurry infiltration may be conducted at any suitable temperature such as at room temperature (about 20° C. to about 35° C.). The slurry infiltration may be enhanced by application of external pressure after slurry introduction such as at one atmosphere pressure gradient.

After slurry infiltration, the structural component preform may undergo melt infiltration. During melt infiltration a molten metal or alloy may wick between the openings of the preforms. In various embodiments, the molten metal or alloy may have a composition that includes silicon, boron, aluminum, yttrium, titanium, zirconium, oxides thereof, and mixtures and combinations thereof. In some instances, graphite powder may be added to assist the melt infiltration. The molten metal or alloy may wick into the remaining pores of the preform through capillary pressure. For example, molten silicon metal may wick into the pores and form silicon carbide to create a matrix between the fibers resulting in a relatively structural component. For example, structural component has densified, the structural component may have a porosity of between about 1 percent and about 10 percent by volume. In one example, a temperature of the molten silicon metal may be between about 1400° C. and about 1500° C. for infiltration. The duration of the infiltration may be between about 15 minutes and 4 hours. The infiltration process may be carried out under vacuum, but in other embodiments melt infiltration may be carried out with an inert gas under atmospheric pressure to limit evaporation losses.

In some embodiments, the insert or sacrificial layer may at least partially wrap around the structural component. The sacrificial layer may wrap entirely around the component or may only cover a portion of the structural component.

In some embodiments, ceramic fibers may be chopped to create the insert or sacrificial layer. The fibers may be chopped by using a needle punch method. The needle punch method may include feeding the fibers through a needle loom wherein the needles punch through the fibers at least one time. The needle punches through the layer of fibers multiple times until the layer of fibers are chopped and the fibers may then be drawn off the needle loom. The fibers may also be open braided or unwoven and may not need to go through the needle punch method. Any suitable method for providing substantially unwoven, chopped, or unbraided fibers may be used. Needle punching may be performed prior to bonding the insert to the structural layer or may be performed after bonding the insert and the structural component. Needle punching may not go into the structural component.

In some embodiments, the insert may be rigidized prior to joining the insert to the ceramic structural preform. The insert may be rigidized via chemical vapor deposition or chemical vapor infiltration similarly to the method of rigidizing or infiltrating the preform described below. After CVI the insert may have a porosity of between about 0% by volume and about 50% by volume. The partially rigidized, but still porous insert may then be joined to the ceramic structural preform and rigidized or densified further through the melt infiltration and slurry infiltration processes. In this embodiment, the insert and ceramic structural preform may be co-infiltrated through slurry infiltration and melt infiltration contemporaneously. After co-infiltration the insert may have a porosity of between about 0% by volume and about 10% by volume.

In some embodiments, the tool for holding the insert, the ply, the structural component or any combination thereof may have a recess for positioning the components. The recess in the tool may also help to form the recess within the structural component for mating with the insert.

In some embodiments, after any combination of methods described herein the insert or sacrificial layer may be machined to a final shape. Machining of the insert may allow the structural component to achieve the necessary geometry and tolerance requirements without exposing the structural component to the environment. The insert may be placed along any surface of the structural component which may require machining.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An assembly for use in a gas turbine engine, the assembly comprising
   a ceramic matrix composite component having an exterior surface,
   a monolithic insert bonded to the exterior surface of the ceramic matrix composite component, and
   a polymer char sandwiched between the monolithic insert and the exterior surface of the ceramic matrix composite component that bonds the monolithic insert to the ceramic matrix composite component, wherein the ceramic matrix composite component and the monolithic insert are co-infiltrated with silicon, silicon alloy, silicon carbide, or a combination thereof.

2. The assembly of claim 1, wherein the monolithic insert comprises a resin char comprising silicon containing ceramic material, chopped carbon fibers, chopped silicon carbide fibers, or a combination thereof.

3. The assembly of claim 1, wherein the monolithic insert comprises a pressed powder comprising silicon carbide powder and a binding agent.

4. The assembly of claim 1, wherein the monolithic insert comprises a ceramic material comprising silicon carbide.

5. The assembly of claim 1, wherein the monolithic insert comprises a reticulated foam having a continuous porosity.

6. The assembly of claim 1, wherein the ceramic matrix composite component comprises a blade track, a vane, a blade, a combustor tile, an exhaust tail cone, or a combination thereof.

7. The assembly of claim 1, wherein the ceramic matrix composite component comprises a recess along the exterior surface for mating with the monolithic insert.

8. The assembly of claim 7, wherein the ceramic matrix composite component comprises a blade track segment with the recess along the exterior surface.

9. The assembly of claim 8, wherein the monolithic insert comprises a dovetail post arranged to mate with the recess of the blade track segment.

10. The assembly of claim 8, wherein the monolithic insert comprises a positioning tab for mating with the recess of the blade track segment.

11. The assembly of claim 1, further comprising a ply of fabric wrapped over at least a portion of the monolithic insert and the ceramic matrix composite.

12. The assembly of claim 11, wherein the ply of fabric comprises silicon-carbide fibers.

13. A method of joining a monolithic insert to a ceramic matrix composite component for use in a gas turbine engine, the method comprising
providing a ceramic preform comprising silicon carbide fibers,
depositing a pre-ceramic polymer along an exterior surface of the ceramic preform,
positioning the monolithic insert along the exterior surface of the ceramic preform such that the pre-ceramic polymer is sandwiched between the ceramic preform and the monolithic insert,
heating the pre-ceramic polymer to form a polymer char that bonds the monolithic insert to the ceramic preform, and
co-infiltrating the ceramic preform and the monolithic insert with liquid silicon, silicon alloy, silicon carbide, or a combination thereof.

14. The method of claim 13, wherein co-infiltrating comprises chemical vapor infiltration, chemical vapor deposition, slurry infiltration, melt infiltration, polymer impregnation and pyrolysis, or a combination thereof.

15. The method of claim 14, wherein the pre-ceramic polymer comprises a ceramic phase, SiC, a transition metal, a transition metal boride, a transition metal silicide, or combinations thereof.

16. The method of claim 13, wherein heating the pre-ceramic polymer is performed at a temperature between about 1300° C. and about 1500° C.

17. The method of claim 13, further comprising placing a ply of fabric to cover at least a portion of the monolithic insert and the ceramic preform.

18. The method of claim 13, further comprising machining the monolithic insert after bonding the monolithic insert to the ceramic preform.

19. The method of claim 13, wherein heating the pre-ceramic polymer to form the polymer char is performed contemporaneously with at least some portion of co-infiltrating the ceramic preform and the monolithic insert.

* * * * *